Patented Mar. 4, 1952

2,587,656

UNITED STATES PATENT OFFICE 2,587,656

METHOD OF RECOVERING MAGNESIA

Robert A. Schoenlaub, Cleveland, Ohio, assignor to Sylvester & Company, Cleveland, Ohio, a corporation of Ohio No Drawing. Application April 23, 1947, Serial No. 743,473

12 Claims. (Cl. 23—201)

This invention relates to the separating of magnesia from its ores and minerals. In the past such extractions have been made by chemical means. In one method calcined dolomite is treated with carbonic acid and the magnesia is removed in solution as the soluble bicarbonate. In another method calcined dolomite is reacted with magnesium chloride brines to produce magnesium hydroxide and calcium chloride. Also, some efforts have been made to extract magnesia from dolomite by physical means. Usually such methods depend upon differences in solubility, crystallization, hydration, and the like, which exist between calcium and magnesium compounds. None of these physical methods have reached and maintained a state of successful and steady commercial operation.

All methods suggested or used up to the present time have serious disadvantages which prevent their extensive use for low cost products such as refractories. In general the chemical methods are too expensive and give a hydroxide or hydrated carbonate product which is in adverse form for subsequent processing. The physical methods are uncertain of operation and usually give subgrade magnesia. All of the methods are operable only on restricted compositions and materials. The present invention has for its principal objective a simple process of recovering magnesia from widely available ores and minerals. Other advantages will be apparent from the following description.

To the accomplishment of the foregoing and related ends, the invention, then, comprises the features hereinafter fully described and particularly pointed out in the claims. the following description setting forth in detail certain illustrative embodiments of the invention, these being indicative, however, of but a few of the various ways in which the principle of the invention may be employed.

In general, the features of the process are: (1) to operate on silicious or calcareous raw materials either individually or together; (2) to provide simplicity and economy in operation; and (3) to produce a heavy dense oxide product which can be used as such or be further treated. In general, magnesia is pyrochemically displaced from its combinations, in such manner as to form dicalcium silicate and periclase. This is then allowed to disintegrate or dust by cooling the material such that the high temperature forms of the silicate invert to the low temperature form, with increase of volume physically, disintegrating the material and freeing the periclase as discrete and separable particles. Finally the periclase is separated from the disintegrated or dusted dicalcium silicate by physical or chemical means, or a combination of both, as for instance froth flotation, classification, or any means operable on discrete crystalline phases.

The pyrochemical displacement of magnesia from its compounds may be illustrated by its displacement from dolomite. Mixtures of dolomite and silica when treated react according to the following equation:

(1) 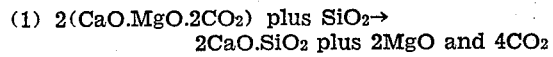
$$2(CaO.MgO.2CO_2) \text{ plus } SiO_2 \rightarrow$$
$$2CaO.SiO_2 \text{ plus } 2MgO \text{ and } 4CO_2$$

The silica may be that, for instance, from a magnesium silicate. Or, a magnesium silicate such as forsterite may be reacted with calcareous material such as limestone, as follows:

(2) 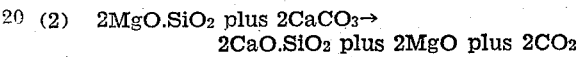
$$2MgO.SiO_2 \text{ plus } 2CaCO_3 \rightarrow$$
$$2CaO.SiO_2 \text{ plus } 2MgO \text{ plus } 2CO_2$$

It is evident from the preceding and the following equations that more magnesia is obtained by reacting calcareous and silicious materials both of which contain magnesia. Thus, reaction between serpentine and dolomite is as follows:

(3) 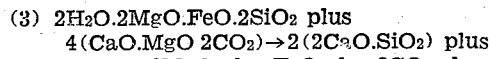
$$2H_2O.2MgO.FeO.2SiO_2 \text{ plus}$$
$$4(CaO.MgO\ 2CO_2) \rightarrow 2(2CaO.SiO_2) \text{ plus}$$
$$6MgO \text{ plus } FeO \text{ plus } 8CO_2 \text{ plus } 2H_2O$$

and reaction between forsterite and dolomite is as follows:

(4) 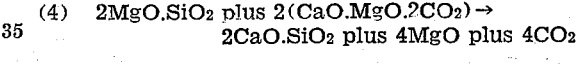
$$2MgO.SiO_2 \text{ plus } 2(CaO.MgO.2CO_2) \rightarrow$$
$$2CaO.SiO_2 \text{ plus } 4MgO \text{ plus } 4CO_2$$

In the practice of this invention, the simple displacement of the magnesia is complicated by side reactions where impurities are involved. The principle impurity encountered is ferrous oxide. There is some chance of iron oxide reacting with calcium oxide according to the following equations:

(5) 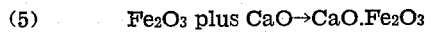 $Fe_2O_3$ plus $CaO \rightarrow CaO.Fe_2O_3$ (6) 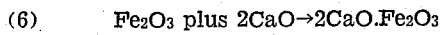 $Fe_2O_3$ plus $2CaO \rightarrow 2CaO.Fe_2O_3$ Usually the iron oxide will be absorbed as a solid solution in the periclase. The principal control of iron oxide is by choice of raw material.

The only other important impurity likely to be encountered is alumina. Generally, alumina is not an important constituent of basic magnesium rocks, but it may be useful in the form of clay as a bonding substance. When present in the raw material, alumina can be reacted and subsequently removed by any of the following reactions:

(7) $Al_2O_3$ plus $2MgO.SiO_2$ plus $2CaCO_3 \rightarrow$
$2CaO.Al_2O_3.SiO_2$ plus $2MgO$ plus $2CO_2$ (8) $Al_2O_3$ plus $CaCO_3 \rightarrow CaCO.Al_2O_3$ plus $CO_2$ (9) $3Al_2O_3$ plus $5CaCO_3 \rightarrow 5CaO.3Al_2O_3$ plus $5CO_2$

(10) $Al_2O_3$ plus $3CaCO_3 \rightarrow 3CaO.Al_2O_3$ plus $3CO_2$

Titania may be present in some raw materials, but it can be removed similarly to alumina.

The raw materials (e. g. dolomite, impure magnesites, brucites, calcite, serpentine, olivene, quartz sandstone, and the like, supplemented, if necessary, by iron ore, clay, etc.) are batched according to the following simple rules: Calcium oxide providing materials are mixed with silica providing materials in amounts sufficient to provide:

a. 2 molecular equivalents of CaO for each of $SiO_2$ plus
b. from 0–3 molecular equivalents of CaO for each of alumina plus
c. from 0–2 molecules of CaO to each $Fe_2O_3$ That is, there is added to the magnesian material an amount of silica or calcium oxide providing material, or both, sufficient to react all of the silica to dicalcium silicate and to form calcium aluminates, ferrites, titanate, and the like, and crystalline periclase. Some impurity, such as iron oxide, or alumina in limited amount, serves useful functions. With highly pure materials, that is in the absence of iron or aluminum oxides, etc., maturation of the periclase in firing will require a temperature of around 3300° F. Maturing of periclase has reference to completeness of reaction and of crystal growth and development. Crystal size should be in excess of 10 microns. As $Fe_2O_3$ and $Al_2O_3$, etc. are increased in amounts, however, the temperature required becomes lower, but is not likely to be lower than 2800° F. in the simple mixtures noted. Oxides of iron and alumina also facilitate the crystallization of periclase to a removable or separable size. And for a product to be used in refractories, oxides of iron and alumina in limited amount are useful as bonds. The amounts of such impurities should be adjusted to give an easily attained maturation temperature in general, and yet not produce softened or clinker formation such as to occasion firing difficulties. Usually from one-half to two parts of impurity ($Fe_2O_3$ or $Al_2O_3$) to ten parts of magnesia is satisfactory. The raw materials thus must be finely ground and fired at sufficiently high temperature to complete reaction and crystal growth.

If maturation is unattainable at reasonable temperatures with the raw materials used, powerful fluxes may be purposely added. The principal fluxes other than the adventitious fluxing agents aforementioned, are halogens. Fluorides may be added as fluorspar, but topaz, cryolite, etc. could be used. In silicious mixtures of the type discussed, fluorides will form either cuspidine ($3CaO.CaF_2.2SiO_2$) of custerite, usually the former. At above 3000° F. most of the fluorine is expelled. Such fluxes lower the temperature of incipient fusion from as high as 3300° F. to as low as 2100° F. The fluosilicates form at the expense of dicalcium silicate and may somewhat reduce the disintegrating or dusting tendency. Also they may cause some firing difficulties, such as "ringing" in a rotary kiln. As an alternative, chlorides in the form of salt, calcium chloride, etc. may be added. They function similarly to fluorides, but are somewhat more evanescent.

With proper compositions and firing, the magnesia crystallizes in comparatively large spherical or cubical grains. If the separation is to be made by physical chemical means, as froth flotation, the size need not be large. If, however, separation is to be made by classification, the periclase should be fired to as large size as possible. Usually the temperature of firing would be around 3200° F. in a rotary kiln.

An important part of the process is the proper cooling of the clinker. In this, dicalcium silicate inverts from the alpha or beta to the gamma form, with a ten per cent increase in volume and the slag spontaneously disintegrates or dusts, forming a fine silicate dust and freeing the periclase granules. However, its action is not always predictable and positive. The factors which seem to govern the dusting are composition and thermal history.

The inversion is partly influenced by the composition. Certain substances have a stabilizing action on the high temperature forms of the silicate. Boric oxide in traces, and phosphates, cromates, zirconates, and sulphates, in larger amounts, will prevent inversion. Usually these substances are not present in the raw material in significant amounts.

The physical treatment of the slag or clinker during and after burning also affects the disintegration. Dicalcium silicate exists in three distinct crystal forms. The alpha or monoclinc form is stable from 2588° F. to fusion at 3766° F. The beta or orthorombic form is stable from 2588° F. to 1247° F. and the gamma form is stable below 1247° F. Quick cooling or heating may permit the existence of any of these forms in a metastable condition. These inversions, so far as it is known, are all reversible.

After dusting, the mixture will be found to comprise a disintegrated powder comprising periclase, dicalcium silicate, and various aluminates, ferrites, etc. The grains of periclase will be more or less discrete and physically separable, but may occasionally have attached silicate. This can be removed by a light milling, scrubbing, or conditioning action. An effective practice is to vigorously agitate the dusted powder in aqueous suspension with or without wetting agents. Another effective means of freeing the silicate is to merely reheat to about 1500° F. and cool it over one or more cycles.

In general, the formation of periclase is accelerated and furthered by the mineralizing agents.

The simplest means of separation is to control the processing to give fine silicate and coarse periclase and to separate by classification. This classification has the advantage of being quite cheap, but it can never be sharp. For magnesia intended for certain purposes, i. e. fettling of hearths, it may be adequate. The separation can be done on conventional classifiers, which are designed for micron sizes. This classification may be either wet or dry.

Usually classification will not give the degree of separation desired. Improvement may be secured by froth flotation. With flotation it is advisable to resort to a light milling, violent conditioning in an agitator, or some similar expedient to insure complete liberation of the MgO. The product of the dusting action will be fine but will not be slimes. Care should be taken that undesirable slimes are either not produced, or are subsequently removed.

Flotation may be easily accomplished by conventional procedures in conventional apparatus. Periclase has a sharp differential flotability over the calcareous and silicious gangue. This differential may be increased by addition of depressants, such as sodium silicate, quebracho, etc. Usually, depressants are not necessary. As promoters, oleic acid, naphthenic acid, sulphonated alcohols and the like may be employed. Frothers, such as pine oil, may or may not be required. Generally, a pound of naphthenic acid or like promoter per ton of solids will give a good separation. The product may be susceptible to further improvement by the reversal of flotation. Surprisingly, if the periclase contains iron, which is the usual case, the separation can be easily accomplished by magnetic means. A content of one or two per cent iron oxide in the periclase will make it magnetic. With more iron oxide, such as about six per cent, it becomes much more magnetic than hematite, but slightly less magnetic than magnetite. Such magnetic periclase can be removed very sharply by any high intensity magnetic device capable of operating in an aqueous slurry, such as a magnetic log washer, Crockett wet belt separator, de-ironer, ferro filter, and the like.

In some cases separation or cleaning can be affected by other means based on electric energy; for instance, by an electrostatic field instead of magnetic.

While the preferred method of operation is by physical means, chemical means may also be used. It is found quite practical to extract all or part of the magnesia from the prepared clinker by a strictly chemical process. For example, the clinker might be allowed to disintegrate or dust, or may be ground if dusting did not provide sufficient liberation, and the material may then be made into an aqueous slurry, and the magnesia be removed as the bicarbonate or as some other soluble salt. However, chemical operations can be used to best advantage as a supplementary step to physical refining.

A convenient way of extracting a high grade magnesia is as follows: The clinker is made, and the bulk of the silicate and gangue eliminated by classification or flotation, etc., as aforedescribed. The magnesia concentrate is then made into about a ten per cent slurry with water, and enough sulphuric or hydrochloric acid is added to more or less react the CaO in the silicates to chlorides, sulphates, etc., and the mixture is allowed to react for a short time. The calcareous impurities decompose preferentially to the periclase, as soluble salts or micron sizes of sulphates and a rather stable suspension of the silica. These impurities may then be classified and washed away, leaving a high grade periclase residue.

Periclase which withstands such treatment is unique in the present state of the art. Usually, periclase hydrates very readily. It is a feature of the present invention, however, that the periclase produced by clinkering with dicalcium silicate in the manner described is exceptionally stable.

The separated magnesia is in a finely divided form. It may be dewatered, mixed with mill scale, chrome ore, or other supplementary agents, and fired at a high temperature in a rotary kiln. If desired, the raw, wet mixture may be briquetted with oxychloride, oxysulphate, or even autogenous bonds, and then fired.

There is no part of the entire operation that is critical or requires special equipment. The grinding, batching and mixing procedures may be conventional and all that seems to be required is a grain size substantially less than −100 mesh, and a reasonable accuracy in formation, according to the instructions we have given. The firing must be thoroughly and completely done. A practical solution is to merely fire the fine raw materials in a large rotary kiln to about 3200° F. Some difficulty may be experienced in firing a pulverulent material. In such cases clay may be completely or in part substituted for magnesian silicates as a source of silica and alumina and as a bonding substance. Such a substitution is shown in the following table:

| Number | 1 | 2 | 3 | 4 | 5 | 6 |
|---|---|---|---|---|---|---|
| Batch: | | | | | | |
| Olivene | 100 | 80 | 60 | 40 | 20 | 0 |
| Clay | 0 | 20 | 40 | 60 | 80 | 100 |
| Dolomite | 252 | 300 | 355 | 407 | 460 | 509 |
| Composition of Resulting Slag: | | | | | | |
| $SiO_2$ | 180 | 17.7 | 17.1 | 17.0 | 16.9 | 16.7 |
| $Al_2O_3$ | | 2.2 | 3.9 | 5.3 | 6.6 | 7.6 |
| $Fe_2O_3$ | 4.0 | 3.0 | 2.2 | 1.5 | .9 | .4 |
| MgO | 44.8 | 41.3 | 37.1 | 35.5 | 33.3 | 31.7 |
| CaO | 33.6 | 36.4 | 38.9 | 40.6 | 42.3 | 43.5 |

With such a substitution the raw batch may be nodulated or briquetted to any degree of strength required. Also, such a substitution affords an easy means of controlling the iron oxide in the product. Cooling, as we have mentioned, may require some modification of conventional equipment, but this need only be the use of an over-size cooler, and a reasonable control. Classification and flotation and magnetic separation are simple steps which present no difficulties to modern technology.

The formation of hard burned periclase in a silicate matrix and subsequent removal of the silicate by physical or chemical means is novel. The periclase so formed differs from available periclase heretofore in being exceptionally inert. For example, it will withstand exposure to water for longer periods of time, and even exposure to mild acids. This is an especially valuable and new characteristic for refractories which are used with water such as mortars, gun mixtures, cements, ramming mixtures and the like. It results from the fact that the crystals are not crushed or broken in the processing and that the external skin of a crystal so formed is more resistant than its internal parts.

As examples of my invention, I cite the following:

I. A mixture of 100 pounds of serpentine and 280 pounds of dolomite is ground to −100 mesh. The composition of the raw materials and fired clinker is approximately as follows:

| | Serpentine | Dolomite | Clinker |
|---|---|---|---|
| $SiO_2$ | 43.20 | .23 | 18.2 |
| $Al_2O_3$ | | .065 | |
| MgO | 40.09 | 21.2 | 44.0 |
| CaO | | 30.3 | 35.5 |
| $H_2O$ | 11.38 | | |
| FeO | 5.24 | | |
| $Fe_2O_3$ | | .051 | 2.4 |
| $CO_2$ | | 47.3 | |

This mixture is fired at 3250° F. for two hours and allowed to dust. The dust is lightly milled by attrition, but not by impact and the −10 microns sizes removed by wet classification. The plus 10 micron size is magnesia suitable for fettling purposes.

II. A mixture of 100 pounds of olivene and 268 pounds of dolomite is ground to —100 mesh. The composition of the raw materials and finished clinker is approximately as follows:

|  | Olivene | Dolomite | Clinkers |
|---|---|---|---|
| $SiO_2$ | 41.17 | .23 | 17.2 |
| $Al_2O_3$ |  | .065 | 1.7 |
| MgO | 49.16 | 21.2 | 44.5 |
| CaO | .04 | 30.3 | 34.0 |
| $H_2O$ |  |  |  |
| FeO |  |  |  |
| $Fe_2O_3$ |  | .057 | 3.1 |
| $CO_2$ |  | 47.3 |  |

The mixture is fired for about two hours at 3250° F. and allowed to dust. The dust is lightly milled by attrition but not by impact and the —10 micron sizes removed by classification. The plus 10 micron size is magnesia suitable for fettling purposes.

III. A mixture of 100 parts of serpentine, 243 parts of dolomite, both as described in Example I, plus 10 parts of fluorspar are milled to —100 mesh. This mixture is then fired to 2950° F. in the presence of carbon for four hours. The composition of the slag so formed is approximately as follows:

| | Per cent |
|---|---|
| $SiO_2$ | 19.5 |
| FeO | 2.4 |
| MgO | 40.6 |
| CaO | 33.3 |
| $CaF_2$ | 4.2 |

This slag is slowly cooled and allowed to disintegrate. It is then lightly milled as for instance in a pebble mill completely full of pebbles so that there is a slight rubbing action, but no impact for one hour. The minus 10 micron sizes are removed. The plus 10 micron sizes are periclase with about 20% attached silicate. This is made up into a 10% slurry with water, and hydrochloric acid added in a ratio of above five parts of acid to ten of solids and vigorously agitated for about 20 minutes. The solids are then removed, washed, and dried. They will be found to comprise unattacked periclase and a small amount of calcium oxychloride. Recovery of the MgO in the acid washing step is 86%. The composition is as follows:

| | Per cent |
|---|---|
| $SiO_2$ | .09 |
| $R_2O_3$ | 8.08 |
| CaO | 4.52 |
| MgO | 87.36 |

IV. 100 parts of olivene, 252 parts of dolomite, both as described in Example II, plus 15 parts of salt, are milled to —100 mesh and fired to 3070° F. for four hours, cooled and allowed to dust. The dust is lightly milled as in Example III and formed into a slurry, containing about 1 part of solids to 10 of water and run through a low intensity magnetic de-ironer. The magnetic part is cleaned by running it through the de-ironer the second time. The concentrate is then acid washed as in Example III to give a final product as follows:

| | Per cent |
|---|---|
| $SiO_2$ | 1.53 |
| $R_2O_3$ | 10.03 |
| CaO | .67 |
| MgO | 87.77 |

V. 100 parts of olivene, 242 parts of dolomite, as described in Example II, plus 4 parts of fluorspar and 7 parts of salt, are milled to —100 mesh and fired to 3050° F. for six hours, cooled and allowed to dust. They are then lightly milled as described in Example III, slurried, and separated magnetically as described in Example IV to give a concentrate of the following composition:

| | Per cent |
|---|---|
| $SiO_2$ | 9.8 |
| $Fe_2O_3$ | 5.6 |
| CaO | 17.4 |
| MgO | 66.2 |

This product is then again formed into a slurry and separated on a high intensity device such as a "Davis Tube" and a product of the following composition obtained:

| | Per cent |
|---|---|
| $SiO_2$ | 5.49 |
| $Fe_2O_3$ | 6.71 |
| CaO | 9.26 |
| MgO | 78.54 |

It is seen thus that whereas heretofore where dealing with magnesia, inversion and dusting of any associated dicalcium silicate has been a serious evil to be avoided or carefully minimized, in order to attain usable refractories, the present invention goes directly contrary and turns the inversion tendency to advantage and forces it on to completion for release of the periclase and at the same time attains a particularly highly matured form of periclase crystals such as not heretofore had. Moreover, from the taking up of iron in the periclase crystals, the magnetic character of the crystals provides a novel magnetic mode of separation.

Other modes of applying the principle of the invention may be employed, change being made as regards the details described, provided the features stated in any of the following claims, or the equivalent of such, be employed.

I therefore particularly point out and distinctly claim as my invention:

1. In a process of the character described, firing at a temperature at least 2800° F. magnesia-containing mineral material and added material which provides a compound selected from the group consisting of calcium oxide, silica and mixtures thereof in sufficient amount to make a $CaO:SiO_2$ ratio of 2:1 and forming crystalline magnesia in a substantial proportion of dicalcium silicate, disrupting the mass by cooling and expansion of the dicalcium silicate, and separating the magnesia from the disrupted dicalcium silicate.

2. In a process of the character described, firing at a temperature above 2100° F. for crystallizing periclase magnesia-containing mineral material and additionally CaO and $SiO_2$ in a ratio of 2:1 to form crystalline magnesia in the presence of dicalcium silicate and a flux, cooling and disrupting the mass by expansion of the dicalcium silicate, and separating the magnesia.

3. In a process of the character described, firing at a temperature at least 2800° F. magnesia-containing mineral material and added material which provides a compound selected from the group consisting of calcium oxide, silica and mixtures thereof in sufficient amount to make a $CaO:SiO_2$ ratio of 2:1 and forming crystalline periclase and a substantial proportion of dicalcium silicate, disrupting the mass by cooling and expansion of the dicalcium silicate, separating the periclase, reheating the periclase, then cooling for expansion and disruption of any adherent dicalcium silicate, and separating the periclase.

4. In a process of the character described, firing at a temperature at least 2800° F. magnesia-containing mineral material and added material which provides a compound selected from the group consisting of calcium oxide, silica and mixtures thereof in sufficient amount to make a CaO:SiO$_2$ ratio of 2:1 and forming crystalline periclase in the presence of a substantial proportion of dicalcium silicate and iron, disrupting the mass by cooling and expansion of the dicalcium silicate, and cleaning the periclase in a magnetic field.

5. In a process of the character described, firing at a temperature at least 2800° F. magnesia-containing mineral material and added material which provides a compound selected from the group consisting of calcium oxide, silica and mixtures thereof in sufficient amount to make a CaO:SiO$_2$ ratio of 2:1 and forming crystalline periclase and a substantial proportion of dicalcium silicate, disrupting the mass by cooling and expansion of the dicalcium silicate, and cleaning the periclase chemically.

6. In a process of the character described, firing at a temperature at least 2100° F. magnesia-containing mineral material and added material which provides a compound selected from the group consisting of calcium oxide, silica and mixtures thereof in sufficient amount to make a CaO:SiO$_2$ ratio of 2:1 and forming crystalline periclase in the presence of dicalcium silicate and an added halide, disrupting the mass by cooling and expansion of the dicalcium silicate, and separating the periclase.

7. In a process of the character described, firing at a temperature at least 2800° F. magnesia-containing mineral material and added material which provides a compound selected from the group consisting of calcium oxide, silica and mixtures thereof in sufficient amount to make a CaO:SiO$_2$ ratio of 2:1 and forming crystalline periclase and a substantial proportion of dicalcium silicate, disrupting the mass by cooling and expansion of the dicalcium silicate, removing the periclase, and cleaning the periclase by dissolving any adherent dicalcium silicate.

8. In a process of the character described, firing above 2800° F. magnesia-containing mineral material in the presence of a substantial proportion of iron oxide and additionally CaO and SiO$_2$ in a ratio of 2:1 to form dicalcium silicate, cooling and disrupting the mass by expansion of the dicalcium silicate, and separating the magnesia.

9. In a process of the character described, firing at about 3200° F. for about 2 hours a finely ground mixture of dolomite and serpentine in proportions of about 280:100 parts by weight respectively, allowing the fired material to cool and disintegrate, lightly milling the disintegrated material, and separating the periclase by classification.

10. In a process of the character described, firing at about 3200° F. for about 2 hours a finely ground mixture of dolomite and olivene in proportions of about 268:100 parts by weight respectively, allowing the fired material to cool and disintegrate, lightly milling the disintegrated material, and separating the periclase by classification.

11. In a process of the character described, firing at 3000–3100° F. for about 4 hours a finely ground mixture of dolomite and olivene in proportions of about 252:100 parts by weight respectively and about 15 parts of salt, allowing the fired material to cool and disintegrate, lightly milling the disintegrated material, and separating the periclase.

12. In a process of the character described, firing at a temperature at least 2800° F. magnesia-containing mineral material in the presence of added lime and silica to provide two mols of CaO for one of SiO$_2$ to form crystalline periclase and dicalcium silicate, allowing the fired material to cool and disintegrate, lightly milling the disintegrated material, digesting out impurites by dilute acid, and separating and washing the periclase.

ROBERT A. SCHOENLAUB.

REFERENCES CITED

The following references are of record in the file of this patent:

UNITED STATES PATENTS

| Number | Name | Date |
|---|---|---|
| 1,527,347 | Browne | Feb. 24, 1925 |
| 2,349,556 | Kleckner | May 23, 1944 |
| 2,393,920 | MacIntire | Jan. 29, 1946 |

OTHER REFERENCES

Bailey, "Trans. Amer. Elec. Chem. Soc.," vol. 81, pages 89–95 (1942).